Patented Mar. 2, 1954

2,671,031

UNITED STATES PATENT OFFICE 2,671,031

NONCHALKING TITANIUM DIOXIDE PRODUCTION

Walter R. Whately, Lynchburg, Va., assignor to American Cyanamid Company, New York, N. Y., a corporation of Maine No Drawing. Application May 10, 1950,
Serial No. 161,253

10 Claims. (Cl. 106—300)

The present invention relates to the production of titanium dioxide pigment possessing improved resistance to chalking. It relates more particularly to the production of titanium dioxide pigment in intimate admixture with small amounts of aluminum oxide and/or hydroxide. The invention includes both the improved chalk resistant titanium dioxide pigment and its method of preparation.

The titanium dioxide pigment industry has for many years employed various so-called finishing treatments in order to impart to the pigment special characteristics regarding color tone, texture, improved oil absorption, and other special properties which render the pigment more suitable for use in the particular vehicle to be employed. In this respect the finishing treatments have included the use of various metal compounds such as zinc oxide, magnesium oxide, and the like materials in a variety of wet and dry classification, grinding, and heat treatments.

The use of aluminum oxide in titanium dioxide finishing treatments is not new in the art. However, the prior art processes have utilized finishing treatments wherein the pigment has first been milled and classified in aqueous condition with or without the addition of an aluminum oxide and the pigment was thereafter dried at temperatures not exceeding about 200° C. It has previously been believed that the employment of temperatures in excess of about 200° C. had a deleterious effect upon the pigment, resulting in discoloration, poor texture, and the like effects.

All of these finishing treatments have been employed without any special regard to the chalking of the pigment either as to its cause or to the actual method of its prevention. The industry has found through trial and error that the addition of certain metallic compounds such as silica and aluminum oxide to titanium dioxide pigments results in a slight improvement in chalk resistance. This improvement has been offset, to some extent, by deterioration of some of the other desirable characteristics of the pigment such as color retention and the like properties.

Recently, experimental evidence has indicated that the chalking of titanium dioxide pigments is due, at least in part, to photooxidation. The titanium dioxide gives off atomic oxygen when exposed to sunlight and thus serves as an oxidant for the vehicles which are employed in the preparation of paints, enamels, and other coating agents. The photooxidation thus leads to the formation of carbon dioxide and produces a gas film between the pigment grains and the binder. Once the pigment has lost its adhesion it sloughs off like chalk and the film of paint finally is completely destroyed.

At present there appear to be two methods of preventing or minimizing chalking of titanium dioxide-containing paints. One method consists in coating the pigment particles with a film of alkali, alkaline earth, or silica which prevents oxygen produced by photooxidation from entering into the pigment-binder interface. The other method consists of addition to the pigment of materials which form surface active groups which decrease the free energy of the titanium dioxide crystal surfaces. It is primarily with this second method of overcoming the deleterious effects of photooxidation that the present invention is concerned.

I have discovered that hydrous aluminum oxide provides a material whose surface activity apparently almost completely nullifies the free energy of the titanium dioxide crystals when applied to the pigment according to the method of the present invention. Briefly stated, it was discovered that when hydrous aluminum oxide is precipitated upon calcined titanium dioxide from an aqueous solution of an ionizable aluminum compound, followed by heat treating the composite pigment, the chalking resistance of the treated pigment is greatly improved while the other desirable pigment properties do not suffer appreciable deterioration.

In its broadest aspect, therefore, the invention comprises the uniform distribution on titanium dioxide pigment of hydrous aluminum oxide followed by a baking treatment at elevated temperatures whereby the hydrous aluminum oxide is at least partially dehydrated and forms a surface active material which minimizes the free energy of the titanium dioxide crystals. The method of obtaining this uniform distribution of the hydrous aluminum oxide on the pigment consists essentially in admixing the pigment with an aqueous solution of an ionizable aluminum compound and precipitating a hydrous aluminum oxide therefrom. Aluminum compounds which have been found satisfactory in my novel method include aluminum sulfate, aluminum nitrate, aluminum chloride, and the like ionizable aluminum salts as well as various aluminates including sodium aluminate, potassium aluminate, and the like compounds.

It has been found that the use of from about 0.5% to about 5% of hydrous aluminum oxide, based on the weight of pigment, in the method of the present invention will result in greatly improved chalk resistance in the treated pigment. While amounts larger than 5% may be employed if desired, there is no additional increase in the degree of chalk resistance obtained by the use of these larger quantities. In the present description of the invention the term "hydrous aluminum oxide" and the formula $Al_2O_3$ are employed synonomously for ease in determining the quantity of aluminum compound to be employed. While the deposited aluminum compound prior to baking may contain some $Al_2O_3$ it is more likely either $Al_2O_3.3H_2O$ or an aluminum hydroxide such as $Al(OH)_3$ or a mixture thereof.

Following the precipitation of the hydrous aluminum oxide on the pigment, the mixture is dried at temperatures up to about 150° C. It is thereafter baked at temperatures ranging from about 500° C. to about 800° C. until the aluminum oxide is dehydrated to the degree necessary to provide a compound having sufficient surface activity to overcome the free energy of the titanium dioxide crystal surfaces. The finished pigment is much more resistant to chalking than titanium dioxide pigments prepared according to the prior art teachings.

As has hereinbefore been stated, the amounts of hydrous aluminum oxide calculated as $Al_2O_3$ which have been found to afford the improvements presented by the present invention are from about 0.5% to about 5% of the weight of $TiO_2$. The presence of less than 0.5% of $Al_2O_3$ on the pigment results in a product which is not appreciably improved over the prior art pigments. On the other hand, the presence of more than about 5% of $Al_2O_3$ does not serve to increase the chalk resistance of the finished pigment over the improvement obtained by employment of the preferred quantities. I have found that from 1 to 2% of $Al_2O_3$ is preferable from the viewpoint of economy and the improvement obtained. After precipitation of the hydrous aluminum oxide on the pigment the treated slurry is filtered, washed and dried.

Subsequent to the drying of the hydroclassified hydrous aluminum oxide-containing pigment slurry, the dried material is heated at temperatures which have been found suitable for dehydration of the hydrous oxide. The dehydration phenomenon is apparently primarily a function of the temperature employed. For example, while a baking treatment of 10 minutes at temperatures within the range of from about 500° C. to 800° C. has been found to result in a pigment product having outstanding resistance to chalking, a longer baking treatment up to about 2 hours does not improve this chalk resistance to any appreciable extent. However, where temperatures substantially in excess of 800° C. are employed there is a distinct tendency for the titanium dioxide to increase in crystal size thus resulting in a finished pigment having decidedly inferior texture, oil absorption and other color characteristics. At these higher temperatures there is also some sintering of the pigment resulting in a product of reduced commercial application.

The method of this invention is applicable to titanium dioxide pigments obtained according to any of the accepted methods of pigment production including titanium dioxide pigments prepared by thermal hydrolysis of titanium sulfate solutions, from various chlorination procedures, as well as from slags consisting mainly of titanium dioxide along with various complex titanates such as calcium, magnesium, and sodium titanates. The application of the novel method of this invention to any such titanium dioxide pigment results in a finished product having improved chalk resistance and other desirable characteristics described above.

The application of hydrous aluminum oxide to any of the above titanium dioxide pigments may be carried out by itself or in conjunction with other precipitants. For example, the art has recognized that the precipitation of certain metallic compounds such as hydrous silicon dioxide and hydrous titanium oxide on pigmentary titanium dioxide imparts to the pigment definite improvement in texture, oil absorption properties, and the like characteristics. I have found that such additional agents may be employed together with the hydrous aluminum oxide of the present invention. The so-treated pigment will thus be characterized by resistance to chalking and, in addition, will possess the improvements to be derived from such other metallic compounds since the baking treatment of this invention does not cause deterioration thereof.

The invention will be further illustrated by the following specific examples. It should be understood, however, that while these examples may describe specific features of the invention, they are presented primarily for purposes of illustration and the invention, in its broader aspects, is not limited thereto.

EXAMPLE 1

To 13 liters of a slurry of hydroclassified rutile $TiO_2$ containing 3132 g. of $TiO_2$ were added solutions of titanium sulfate, sodium silicate and aluminum sulfate in this order. The quantities added were sufficient to provide 1 part of $TiO_2$, 1 part of $SiO_2$, and 2 parts of $Al_2O_3$ for each 100 parts of $TiO_2$ in the slurry. Sodium carbonate solution was then added to the slurry until a pH of 5.0 was reached after which NaOH solution was added until a pH of 7.2 was obtained. The treated slurry was then filtered, washed, and dried at 150° C.

Thereafter the dry pigment was divided into 7 equal parts. One portion was kept as a control sample without further treatment. The remaining 6 samples were heated in an electric muffle furnace for 1 hour at temperatures ranging from 300° C. to 800° C. Heating curves indicated that approximately 40 minutes were required for the pigment to reach the temperature of the muffle furnace. The control and the dehydrated samples were jet milled to lower the oil absorption properties of the finished pigment. Portions of the treated pigments were then ground in an alkyd enamel, tinted with iron blue and exposed in an accelerated weathering unit for 860 hours. The results are tabulated below.

*Table I*

| Sample No. | Dehydration Temperature, °C. | Chalking | | | Gloss | Texture |
|---|---|---|---|---|---|---|
| | | 700 hrs. | 800 hrs. | 860 hrs. | | |
| 1 | 150 | con | bad | v. bad | good | 6 |
| 2 | 500 | sl | con | bad | do | 6.5 |
| 3 | 600 | v. sl | sl | con | do | 7 |
| 4 | 700 | v. sl | sl | sl | do | 6.5 |
| 5 | 800 | v. sl | sl | sl | fair | 7 |

In the above table, the texture values are arbitrary numerals in which 8 represents optimum texture and in which poor texture is represented by 1. It will be seen that all of the samples had very good texture characteristics. Also, in the above table the abbreviations mean the following: con.=considerable; sl.=slight; v. sl.= very slight.

Separate portions of the above described pigments were exposed in alkyd resin to natural weathering for 21 months. The results are tabulated below.

*Table II*

| Sample No. | Chalking | | |
|---|---|---|---|
| | 13 mos. | 18 mos. | 21 mos. |
| 1 | sl | con | con. |
| 2 | sl | con | sl. |
| 3 | v. v. sl | sl | sl. |
| 4 | trace | v. sl | sl. |
| 5 | v. v. sl | v. v. sl | v. sl. |

EXAMPLE 2

Calcined anatase $TiO_2$ was hydroclassified to separate out particles larger than 4 microns in diameter. 1200 g. of this $TiO_2$ was slurried in water to obtain a mixture containing 241 g./liter of $TiO_2$. Solutions of titanium sulfate, sodium silicate and aluminum sulfate were added to the slurry in this order. The quantities of the addition agents were sufficient to provide 1 part of $TiO_2$, 1 part of $SiO_2$ and 2 parts of $Al_2O_3$ for each 100 parts of $TiO_2$ in the slurry. The mixture was heated to 70° C. after which sodium carbonate solution was added until the pH of the slurry was 5.0, after which caustic soda solution was added to obtain a pH of 7.5.

The treated slurry was then filtered, washed and dried at 130° C. to a moisture content of 0.1%. The dried, treated pigment was divided into 3 parts. One sample was kept as a control without further treatment, while the remaining two samples were heated for 10 minutes in an electric muffle furnace at temperatures of 500° C. and 700° C. respectively. The dehydrated samples were thereafter milled to lower the oil absorption properties. The samples were ground in linseed oil, formulated at 23% pigment volume concentration and exposed in an accelerated weathering unit both as untinted and as gray tinted paints. The results are tabulated below.

*Table III*

| Sample No. | Dehydration Temperature, °C. | Chalking | | |
|---|---|---|---|---|
| | | Untinted, 100 hrs. | Gray Tinted | |
| | | | 60 hrs. | 80 hrs. |
| 1 | 130 | con | v. sl | sl. |
| 2 | 500 | sl | none | trace |
| 3 | 700 | v. sl | trace | v. sl. |

EXAMPLE 3

Rutile titanium dioxide pigment was prepared by calcining in the presence of 1% ZnO to prepare a pigment known to possess excellent chalk resistance. The material was hydroclassified and treated according to the procedure set forth above in Example 2. After drying, one portion of the sample was heated to 550° C. in an electric rotating furnace. The other part served as a control sample. Both portions were jet milled to lower the oil absorption thereof. The samples were thereafter exposed in an accelerated weathering machine as untinted and gray tinted paints in the form of 23% pigment volume concentration in linseed oil paint. The chalking results are tabulated bellow.

*Table IV*

| Dehydration Temperature, °C. | Chalking—Untinted Paint | | | | |
|---|---|---|---|---|---|
| | 626 hrs. | 663 hrs. | 720 hrs. | 745 hrs. | 767 hrs. |
| 130 | sl | sl | sl | bad | bad. |
| 550 | v. sl | v. sl | v. sl | sl | sl. |

*Table V*

| Dehydration Temperature °C. | Chalking—Gray Tinted Paint | | | |
|---|---|---|---|---|
| | 508 hrs. | 550 hrs. | 608 hrs. | 667 hrs. |
| 130 | v. v. sl | v. sl | sl | bad. |
| 550 | trace | v. v. sl | v. sl | con. |

EXAMPLE 4

To 5 liters of an aqueous slurry of hydroclassified calcined rutile $TiO_2$ containing 1000 g. of pigment was added a solution of aluminum sulfate containing the equivalent of 2.0% $Al_2O_3$ based on the weight of $TiO_2$. The slurry was heated at 70° C. for one hour after which sodium carbonate solution was added until a pH of 5.0 was reached and then NaOH solution was added to obtain a pH of 7.8. The slurry was filtered and washed until the soluble salt content was less than 0.1%. Thereafter the filter cake was dried at 130° C. The dried material was then heated to 800° C. in an electric muffle furnace and held at this temperature for 10 minutes. After cooling the pigment was jet milled. The treated pigment had excellent resistance to chalking when incorporated in an alkyl enamel formulation and exposed to natural weathering for a period of several months.

EXAMPLE 5

The procedure of Example 4 was repeated except that the amount of aluminum chloride solution employed contained the equivalent of 1.0% $Al_2O_3$ based on the weight of pigment. The chalk resistance of the treated pigment was approximately equal to that of the product obtained in Example 4.

EXAMPLE 6

Calcined rutile $TiO_2$ was treated according to the procedure described in Example 4 except that the amount of aluminum nitrate employed contained the equivalent of 5.0% $Al_2O_3$ based on the weight of the pigment. The chalk resistance of the product was substantially the same as that of the product of Example 4.

EXAMPLE 7

A 5 liter slurry of calcined rutile $TiO_2$ was treated according to the procedure set forth in Example 4 except that a titanium sulfate solution containing the equivalent of 1.0% $TiO_2$, based on the weight of the pigment, was substituted for the aluminum sulfate solution. The product had poor chalk resistance when tested in the same manner as the product of Example 4.

EXAMPLE 8

The procedure of Example 7 was repeated except that solutions of titanium sulfate and sodium silicate containing the equivalent of 1.0% $TiO_2$ and 1% $SiO_2$, based on the weight of the pigment, were used in place of the aluminum sulfate solution. The product had poor chalk resistance.

EXAMPLE 9

To 2.66 liters of an aqueous slurry of hydroclassified rutile $TiO_2$ containing 500 g. of $TiO_2$ was added an aqueous solution of sodium aluminate equivalent to 1.5% $Al_2O_3$ based on the $TiO_2$ present. The slurry was heated to 70° C. and held at this temperature for one hour after which dilute $H_2SO_4$ was added until a pH of 7.0 was obtained. The slurry was thereafter agitated for one hour at 70° C. after which it was filtered and the filter cake was washed with 5 liters of water. The filter cake was then dried at 135° C. to a moisture content of less than 0.2%. The dried material was heated to 800° C. in an electric furnace and held at this temperature for 10 minutes. After cooling the baked pigment was jet milled.

The product obtained had excellent resistance to chalking when tested in an accelerated weathering testing machine.

EXAMPLE 10

The procedure of Example 9 was repeated except that an equivalent amount of potassium aluminate was employed instead of sodium aluminate. The product obtained had chalk resistance equal to that of the product of Example 9.

EXAMPLE 11

The procedure of Example 9 was repeated except that a solution of barium aluminate was substituted for the sodium aluminate and a dilute HCl solution was substituted for the dilute $H_2SO_4$. The product obtained was equal in every respect to the product of Example 9.

I claim:

1. In a process of preparing a titanium dioxide pigment possessing improved resistance to chalking wherein the particles of said pigment in aqueous slurry are coated with a hydrous aluminum oxide, the weight of said oxide as $Al_2O_3$ being about 0.5% to about 5% of the weight of said pigment, and said coated particles are then heated, the step of heating the thus coated pigment between about 500° C. and the higher temperature at which the pigment particles increase in size, until the hydrous aluminum oxide is at least partially dehydrated.

2. Process according to claim 1, wherein the temperature to which the coated pigment is heated is between 500° and 800° C.

3. Process according to claim 2, wherein the coated pigment is heated to between 500° and 800° C. for about 10 minutes.

4. Process according to claim 3, wherein the weight of the hydrated aluminum oxide as $Al_2O_3$ on the titanium dioxide particles is 1-2% of the weight of said particles.

5. In a process of preparing a titanium dioxide pigment wherein a slurry of a titanium dioxide pigment is slurried with an aqueous solution of an ionizable aluminum containing salt, and the aluminum content of said salt is precipitated on the particles of said pigment as a hydrous aluminum oxide, the weight of said oxide as $Al_2O_3$ being 0.5% to 5% of the weight of said titanium dioxide, and the thus coated pigment is filtered from said slurry, the step of heating the coated pigment between about 500° C. and the higher temperature at which the pigment particles increase in size until the hydrous aluminum oxide is at least partially dehydrated.

6. Process according to claim 5 wherein the temperature to which the pigment is heated is between 500° and 800° C.

7. Process according to claim 6 wherein the coated pigment is heated to between 500° and 800° C. for about 10 minutes.

8. Process according to claim 7 wherein the weight of the hydrated aluminum oxide, as $Al_2O_3$, on the titanium dioxide particles is 1-2% of the weight of said particles.

9. Process according to claim 5 wherein the ionizable aluminum containing compound is aluminum sulfate.

10. Process according to claim 5 wherein the ionizable aluminum containing compound is sodium aluminate.

WALTER R. WHATELY.

References Cited in the file of this patent

UNITED STATES PATENTS

| Number | Name | Date |
|---|---|---|
| 2,284,772 | Seidel | June 2, 1942 |
| 2,346,322 | Nelson | Apr. 11, 1944 |
| 2,369,246 | Peterson | Feb. 13, 1945 |
| 2,441,225 | Pechukas | May 11, 1948 |
| 2,559,638 | Krchma et al. | July 10, 1951 |